United States Patent
Chen et al.

(10) Patent No.: US 6,673,735 B1
(45) Date of Patent: Jan. 6, 2004

(54) PREPARATION OF CATALYST COMPOSITIONS

(75) Inventors: Eugene Y. Chen, Fort Collins, CO (US); William J. Kruper, Jr., Sanford, MI (US)

(73) Assignee: Dow Global Technologies Inc., Midland, MI (US)

( * ) Notice: Subject to any disclaimer, the term of this patent is extended or adjusted under 35 U.S.C. 154(b) by 518 days.

(21) Appl. No.: 09/687,395

(22) Filed: Oct. 13, 2000

Related U.S. Application Data

(60) Provisional application No. 60/167,304, filed on Nov. 24, 1999.

(51) Int. Cl.[7] ............................ B01J 31/00; B01J 37/00; C08F 4/02; C08F 4/60
(52) U.S. Cl. ..................................... 502/103
(58) Field of Search .......................... 502/103

(56) References Cited

U.S. PATENT DOCUMENTS

| | | | |
|---|---|---|---|
| 5,453,410 A | | 9/1995 | Kolthammer et al. |
| 5,470,993 A | | 11/1995 | Devore et al. |
| 5,527,929 A | | 6/1996 | Timmers et al. |
| 5,556,928 A | | 9/1996 | Devore et al. |
| 5,602,269 A | | 2/1997 | Biagini et al. |
| 5,616,664 A | | 4/1997 | Timmers et al. |
| 5,624,878 A | | 4/1997 | Devore et al. |
| 5,756,609 A | * | 5/1998 | Cohen .......................... 526/127 |
| 5,801,113 A | * | 9/1998 | Jejelowo et al. ............. 502/104 |
| 6,211,111 B1 | * | 4/2001 | Chen et al. .................. 502/152 |
| 6,387,838 B2 | * | 5/2002 | Chen et al. .................. 502/102 |

FOREIGN PATENT DOCUMENTS

| | | |
|---|---|---|
| EP | 574258 | 12/1993 |
| EP | 520732 | 12/1995 |
| EP | 694548 | 1/1996 |
| WO | WO 00/09513 | 2/2000 |

OTHER PUBLICATIONS

Prog. Poly. Sci., Reddy et al, vol. 20, pp. 309–367, 1995.
J. Am. Chem. Soc., Marks et al, vol. 118, pp. 12451–12452, 1996.
J. Am. Chem. Soc., Chen et al, vol. 119, pp. 2582–2583, 1997.
Organometallics, Jia et al, vol. 16, pp. 842–857, 1997.
J. Am. Chem. Soc., Coles et al, vol. 119, p. 8126, 1997.
Stud. in Surf. Sci. Catal., Ewen, vol. 89, pp., 405–410, 1994.

* cited by examiner

*Primary Examiner*—Mark L. Bell
*Assistant Examiner*—Jennine Brown

(57) ABSTRACT

A process for forming a composition useful as a catalyst for the polymerization of addition polymerizable monomers, the steps of the process comprising:
  a) contacting under exchange reaction conditions a tri (hydrocarbyl)aluminum compound with a tri (fluoroaryl)boron compound; and
  b) contacting the reaction product from step a) without recovery or isolation thereof, with a neutral Group 3–10 metal complex.

3 Claims, No Drawings

PREPARATION OF CATALYST COMPOSITIONS

CROSS REFERENCE STATEMENT

This application claims the benefit of U.S. Provisional Application No. 60/167,304, filed Nov. 24, 1999.

BACKGROUND OF THE INVENTION

The present invention relates to a method useful for forming derivatives of Group 3–10 metal compounds that are useful as catalysts and that are particularly adapted for use in the coordination polymerization of unsaturated compounds with improved efficiency and performance. Such compounds are particularly advantageous for use in a polymerization process wherein at least one polymerizable monomer is contacted with the catalyst compound under polymerization conditions to form a polymeric product.

It is previously known in the art to activate Ziegler-Natta polymerization catalysts, particularly such catalysts comprising Group 3–10 metal complexes containing delocalized π-bonded ligand groups, by the use of an activator. Generally in the absence of such an activator compound, also referred to as a cocatalyst, little or no polymerization activity is observed. A class of suitable activators are aluminoxanes, or alkylaluminoxanes, which are generally believed to be oligomeric or polymeric alkylaluminoxy compounds, including cyclic oligomers. Generally such compounds contain, on average about 1.5 alkyl groups per aluminum atom, and are prepared by reaction of trialkylaluminum compounds or mixtures of compounds with water (Reddy et al, *Prog. Poly. Sci.*, 1995, 20, 309–367). The resulting product is in fact a mixture of various substituted aluminum compounds including especially, trialklyaluminum compounds (resulting from incomplete reaction of the trialkylaluminum starting reagent or decomposition of the alumoxane). The amount of such free trialkylaluminum compound in the mixture generally varies from 1 to 50 percent by weight of the total product. Examples of alumoxanes include methylalumoxane (MAO) made by hydrolysis of trimethylaluminum as well as modified methylalumoxane (MMAO), made by hydrolysis of a mixture of trimethylaluminum and triisobutylaluminum. MMAO advantageously is more soluble in aliphatic solvents than is MAO.

A different type of activator compound is a Bronsted acid salt capable of transferring a proton to form a cationic derivative or other catalytically active derivative of such Group 3–10 metal complex. Preferred Bronsted acid salts are such compounds containing a cation/anion pair that is capable of rendering the Group 3–10 metal complex catalytically active. Suitable activators comprise fluorinated arylborate anions, most preferably, the tetrakis (pentafluorophenyl)borate anion. Additional suitable anions include sterically shielded diboron anions of the formula:

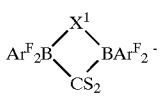

wherein:

S is hydrogen, alkyl, fluoroalkyl, aryl, or fluoroaryl, $Ar^F$ is fluoroaryl, and $X^1$ is either hydrogen or halide, disclosed in U.S. Pat. No. 5,447,895.

Examples of preferred charge separated (cation/anion pair) activators are protonated ammonium, sulfonium, or phosphonium salts capable of transferring a hydrogen ion, disclosed in U.S. Pat. No. 5,198,401, U.S. Pat. No. 5,132,380, U.S. Pat. No. 5,470,927, and U.S. Pat. No. 5,153,157, as well as oxidizing salts such as carbonium, ferrocenium and silyilium salts, disclosed in U.S. Pat. No. 5,350,723, U.S. Pat. No. 5,189,192 and U.S. Pat. No. 5,626,087.

Further suitable activators for the above metal complexes include strong Lewis acids including (trisperfluorophenyl) borane and tris(perfluorobiphenyl)borane. The former composition has been previously disclosed for the above stated end use in EP-A-520,732, and elsewhere, whereas the latter composition is disclosed in Marks, et al., *J. Am. Chem. Soc.*, 118, 12451–12452 (1996). Additional teachings of the foregoing activators may be found in Chen, et al, *J. Am. Chem. Soc.* 1997, 119, 2582–2583, Jia et al, *Organometallics*, 1997, 16, 842–857. and Coles et al, *J. Am. Chem. Soc.* 1997, 119, 8126–8126.

In U.S. Pat. No. 5,453,410, an alumoxane, particularly methylalumoxane, was disclosed for use in combination with constrained geometry, Group 4 metal complexes, especially in a molar ratio of metal complex to alumoxane of from 1/1 to 1/50. This combination beneficially resulted in improved polymerization efficiency. Similarly, in U.S. Pat. No. 5,527,929, U.S. Pat. No. 5,616,664, U.S. Pat. No. 5,470,993, U.S. Pat. No. 5,556,928, U.S. Pat. No. 5,624,878, various combinations of metal complexes with trispentafluorophenyl boron cocatalyst, and optionally an alumoxane, were disclosed for use as catalyst compositions for olefin polymerization.

It is known that an exchange reaction between aluminum trialkyl compounds and tris(perfluorophenyl)borane occurs under certain conditions. This phenomenon has been previously described in U.S. Pat. No. 5,602,269. Tris (perfluorophenyl)aluminum is a strong Lewis acid as well. However, it generally performs poorly by itself as an activator compared with tris(perfluorophenyl)borane. Similarly, it has further been demonstrated that active catalysts resulting from the use of an aluminate anion based upon tris (perfluorophenyl)aluminum for the activation of ansa-metallocenes and biscyclopentadienyl derivatives of zirconium(IV) are generally of lower activity than those formed by the corresponding borane (Ewen, *Stud. in Surf. Sci. Catal.* 1994, 89, 405–410). The foregoing tri(fluoroaryl) aluminum compounds are considered to be moderately shock and temperature sensitive and difficult to handle in the pure state. In order to avoid this problem, the compounds may be prepared as adducts with Lewis bases such as ethers and/or retained in relatively dilute hydrocarbon solution. Disadvantageously, however, the presence of an ether in the catalyst composition detrimentally affects the ability to use the compounds as activators for metal complexes, and shipment of the activator compound in dilute solution adds to catalyst costs.

SUMMARY OF THE INVENTION

According to the present invention there is now provided a process for forming a composition useful as a catalyst for the polymerization of addition polymerizable monomers, the steps of the process comprising:

a) contacting under exchange reaction conditions a tri (hydrocarbyl)aluminum compound with a tri (fluoroaryl)boron compound; and b) contacting the reaction product from step a) without recovery or isolation thereof, with a neutral Group 3–10 metal complex.

Additionally, there is provided a process for polymerization of one or more addition polymerizable monomers comprising contacting the same, optionally in the presence of an inert aliphatic, alicyclic or aromatic hydrocarbon, with the catalyst composition prepared by the foregoing process, or a supported derivative thereof.

Desirably, the exchange reaction is conducted in a dilute hydrocarbon solution and the reaction product retained, to the extent it is retained, in relatively dilute concentration in such hydrocarbon solvent. Effectively, the process uses the Group 3–10 metal complex as a base to react with the fluoroarylaluminum specie formed in the exchange reaction, thereby driving the reaction to completion and avoiding formation or recovery of a shock sensitive composition. Further desirably, the resulting composition is added to a polymerization reactor simultaneously with formation of the active catalyst composition or shortly thereafter, thereby avoiding storage or handling of the resulting complex in pure or concentrated form. In a most preferred embodiment, the foregoing process is conducted continuously, and the catalytically active product is continuously injected into a polymerization reactor substantially concurrently as it is formed or shortly thereafter. In a particular embodiment the catalytically active product is not stored in a separate container from the reactor in which it is formed prior to use as a polymerization catalyst. The process allows for the use of highly active aluminum Lewis acid catalyst activators in high efficiency while avoiding the need for their recovery, storage or transport or the storage or transport of the sensitive fluoroarylalumium Lewis acid compound.

Desirably, the metal complex contains one or more ligand groups able to form a partially or fully charge separated cationic or polycationic metal complex as the catalyst composition. Where the Group 3–10 metal complex contains at least 2 hydrocarbyl groups, particularly, at least 2 dimethyl groups, the resulting active metal complex generally contains two μ-bridging hydrocarbyl anionic ligand groups. As a particular example, in the activation of dimethylsilanebis(indenyl-1-yl)zirconium dimethyl, the resulting active species is dimethylsilanebis(indenyl-1-yl)zirconium bis[(μ-methyl)tris(pentafluorophenyl) aluminum. Similarly, when dimethylsilyl(tetramethylcyclopentadienyl((t-butylamido) titanium dimethyl is activated, the resulting active catalytic species is dimethylsilyl(tetramethylcyclopentadienyl ((t-butylamido)titanium bis[(μ-methyl)tris(pentafluorophenyl) aluminum.

The reactants are contacted in a molar ratio of aluminum compound to boron compound from 1:0.1 to 1:10, preferably from 1:0.5 to 1:6, most preferably from 1:0.8 to 1:2.5 and at a temperature from −50 to 200° C., preferably 0–60° C., most preferably 20–50° C. Before removing the exchange products from the reactor, preferably concurrently with or shortly after step a) is conducted, the reaction mixture is contacted with a neutral Group 3–10 metal complex. Suitable solvents for use in the foregoing process are hydrocarbons, especially aliphatic hydrocarbons. Preferably the solvent does not contain an appreciable quantity of a Lewis base. Most preferably no Lewis base is present. The resulting composition may be deposited on an inert support, especially a particulated metal oxide or polymer, if desired, especially for use in a gas phase, powder bed or slurry polymerization.

The group 3–10 metal compounds resulting from the foregoing combination are highly active catalysts for use in olefin polymerizations, particularly where Group 4 metal complexes containing one or two cyclopentadienyl groups (including substituted, multiple ring and partially hydrogenated cyclopentadienyl derivatives) are employed in step b). When in use as a catalyst composition the molar ratio of metal complex: polymerizable compound employed is from $10^{-12}$:1 to $10^{-1}$:1, more preferably from $10^{-12}$:1 to $10^{-5}$:1. At the same time as the foregoing active catalyst species is formed, a byproduct of boron and at least one $Q^1$ group is also formed. Such byproducts of the equilibrium reaction may be removed from the reaction mixture prior to usage thereof, if desired.

Suitable metal complexes for use in combination with the foregoing cocatalysts include any complex of a metal of Groups 3–10 of the Periodic Table of the Elements capable of being activated to polymerize addition polymerizable compounds, especially olefins by the present activators. Examples include Group 10 diimine derivatives corresponding to the formula:

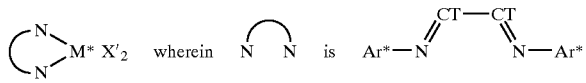

DETAILED DESCRIPTION

All references herein to elements belonging to a certain Group refer to the Periodic Table of the Elements published and copyrighted by CRC Press, Inc., 1995. Also any reference to the Group or Groups shall be to the Group or Groups as reflected in this Periodic Table of the Elements using the IUPAC system for numbering groups. Where any reference is made herein to any publication, patent application or provisional patent application, the contents thereof are incorporated herein in their entirety by reference for purposes of United States practice.

Suitable tri(hydrocarbyl)aluminum compounds for use herein correspond to the formula: $AlQ^1_3$, wherein, $Q^1$ independently each occurrence is alkyl, cycloalkyl, or aryl of up to 20 carbons, more preferably methyl, ethyl, or isobutyl. Suitable tri(fluoroaryl)boron compounds for use herein correspond to the formula: $BAr^f_3$, wherein, $Ar^f$ independently each occurrence is a fluoroaryl group of up to 20 carbons, more preferably pentaflurophenyl.

M* is Ni(II) or Pd(II);
X' is hydrocarbyl;
Ar* is an aryl group, especially 2,6-diisopropylphenyl or aniline group; and
CT—CT is 1,2-ethanediyl, 2,3-butanediyl, or form a fused ring system wherein the two T groups together are a 1,8-naphthanediyl group.

Similar complexes to the foregoing are also disclosed by M. Brookhart, et al., in *J. Am. Chem. Soc.*, 118, 267–268 (1996) and *J. Am. Chem. Soc.*, 117, 6414–6415 (1995), as being active polymerization catalysts especially for polymerization of α-olefins, either alone or in combination with polar comonomers such as vinyl chloride, alkyl acrylates and alkyl methacrylates.

Additional complexes include derivatives of Group 3, 4, or Lanthanide metals containing from 1 to 3 π-bonded anionic or neutral ligand groups, which may be cyclic or non-cyclic delocalized π-bonded anionic ligand groups.

Exemplary of such π-bonded anionic ligand groups are conjugated or nonconjugated, cyclic or non-cyclic dienyl groups, allyl groups, boratabenzene groups, phosphole groups and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 hetero atom containing moiety. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such radicals may together form a fused ring system, including partially or fully hydrogenated fused ring systems, or they may form a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups. Examples of Group 15 or 16 hetero atom containing moieties include amine, phosphine, ether or thioether moieties or divalent derivatives thereof, for example amide, phosphide, ether or thioether groups bonded to the transition metal or Lanthanide metal, and bonded to the hydrocarbyl group or to the hydrocarbyl-substituted metalloid containing group.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, as well as $C_{1-10}$ hydrocarbyl-substituted or $C_{1-10}$ hydrocarbyl-substituted silyl substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, and tetrahydroindenyl.

The boratabenzenes are anionic ligands which are boron containing analogues to benzene. They are previously known in the art having been described by G. Herberich, et al., in *Organometallics*, 1995, 14, 1, 471–480. Preferred boratabenzenes correspond to the formula:

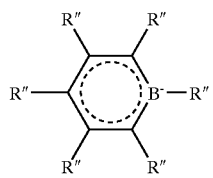

wherein R" is selected from the group consisting of hydrocarbyl, silyl, or germyl, said R" having up to 20 non-hydrogen atoms.

Phospholes are anionic ligands that are phosphorus-containing analogues to a cyclopentadienyl group. They are previously known in the art having been described by WO 98/50392, and elsewhere. Preferred phosphole ligands correspond to the formula:

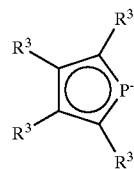

wherein $R^3$ is as previously defined.

In complexes involving divalent derivatives of such delocalized π-bonded groups one atom thereof is bonded by means of a covalent bond or a covalently bonded divalent group to another atom of the complex thereby forming a bridged system.

More preferred are metal complexes corresponding to the formula:

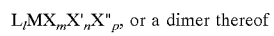

$L_lMX_mX'_nX''_p$, or a dimer thereof wherein:

L is an anionic, delocalized, π-bonded group that is bound to M, containing up to 50 nonhydrogen atoms, optionally two L groups may be joined together through one or more substituents thereby forming a bridged structure, and further optionally one L may be bound to X through one or more substituents of L;

M is a metal of Group 4 of the Periodic Table of the Elements in the +2, +3 or +4 formal oxidation state;

X is an optional, divalent substituent of up to 50 non-hydrogen atoms that together with L forms a metallocycle with M;

X' is an optional neutral Lewis base having up to 20 non-hydrogen atoms;

X" each occurrence is a monovalent, anionic moiety having up to 40 non-hydrogen atoms, optionally, two X" groups may be covalently bound together forming a divalent dianionic moiety having both valences bound to M, or form a neutral, conjugated or nonconjugated diene that is π-bonded to M (whereupon M is in the +2 oxidation state), or further optionally one or more X" and one or more X' groups may be bonded together thereby forming a moiety that is both covalently bound to M and coordinated thereto by means of Lewis base functionality;

l is 1 or 2;

m is 0 or 1;

n is a number from 0 to 3;

p is an integer from 0 to 3; and the sum, l+m+p, is equal to the formal oxidation state of M.

Such preferred complexes include those containing either one or two L groups. The latter complexes include those containing a bridging group linking the two L groups. Preferred bridging groups are those corresponding to the formula $(ER^*_2)_x$ wherein E is silicon or carbon, R* independently each occurrence is hydrogen or a group selected from silyl, hydrocarbyl, hydrocarbyloxy and combinations thereof, said R* having up to 30 carbon or silicon atoms, and x is 1 to 8. Preferably, R* independently each occurrence is methyl, benzyl, tert-butyl or phenyl.

Examples of the foregoing bis(L) containing complexes are compounds corresponding to the formula:

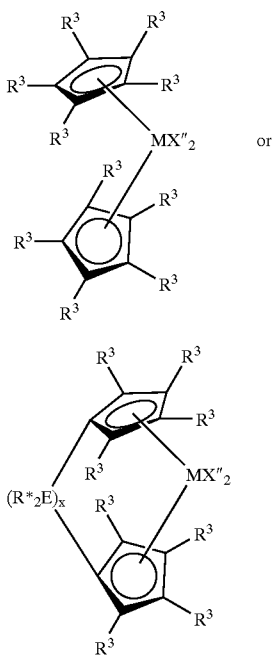

(I)

(II)

wherein:
M is titanium, zirconium or hafnium, preferably zirconium or hafnium, in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and X" independently each occurrence is an anionic ligand group of up to 40 nonhydrogen atoms, or two X" groups together form a divalent anionic ligand group of up to 40 nonhydrogen atoms or together are a conjugated diene having from 4 to 30 non-hydrogen atoms forming a π-complex with M, whereupon M is in the +2 formal oxidation state, and R*, E and x are as previously defined.

The foregoing metal complexes are especially suited for the preparation of polymers having stereoregular molecular structure. In such capacity it is preferred that the complex possess C2 symmetry or possess a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.* 110, 6255–6256 (1980). Examples of chiral structures include bis-indenyl complexes. Similar systems based on Ti(IV) or Zr(IV) were disclosed for preparation of isotactic olefin polymers in Wild et al., *J. Organomet. Chem*, 232, 233–47, (1982).

Exemplary bridged ligands containing two π-bonded groups are: (dimethylsilyl-bis-cyclopentadienyl), (dimethylsilyl-bis-methylcyclopentadienyl), (dimethylsilyl-bis-ethylcyclopentadienyl, (dimethylsilyl-bis-t-butylcyclopentadienyl), (dimethylsilyl-bis-tetramethylcyclopentadienyl), (dimethylsilyl-bis-indenyl), (dimethylsilyl-bis-tetrahydroindenyl), (dimethylsilyl-bis-fluorenyl), (dimethylsilyl-bis-tetrahydrofluorenyl), (dimethylsilyl-bis-2-methyl-4-phenylindenyl), (dimethylsilyl-bis-2-methylindenyl), (dimethylsilyl-cyclopentadienyl-fluorenyl), (1,1,2,2-tetramethyl-1,2-disilyl-bis-cyclopentadienyl), (1,2-bis(cyclopentadienyl) ethane, and (isopropylidene-cyclopentadienyl-fluorenyl).

Preferred X" groups are selected from hydride, hydrocarbyl, silyl, germyl, halohydrocarbyl, halosilyl, silyl-hydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups, especially methyl or benzyl.

A further class of metal complexes utilized in the present invention correspond to the formula:

$$L_lMX_mX'_nX''_p, \text{ or a dimer thereof}$$

wherein:
L is an anionic, delocalized, π-bonded group that is bound to M, containing up to 50 nonhydrogen atoms;

M is a metal of Group 4 of the Periodic Table of the Elements in the +2, +3 or +4 formal oxidation state;

X is a divalent substituent of up to 50 non-hydrogen atoms that together with L forms a metallocycle with M;

X' is an optional neutral Lewis base ligand having up to 20 non-hydrogen atoms;

X" each occurrence is a monovalent, anionic moiety having up to 20 non-hydrogen atoms, preferably hydrocarbyl or silyl, and optionally two X" groups together may form a divalent anionic moiety having both valences bound to M or a neutral $C_{5-30}$ conjugated diene, and further optionally X' and X" may be bonded together thereby forming a moiety that is both covalently bound to M and coordinated thereto by means of Lewis base functionality;

l is 1 or 2;

m is 1;

n is a number from 0 to 3;

p is an integer from 1 to 2; and the sum, l+m+p, is equal to the formal oxidation state of M.

Preferred divalent X substituents include groups containing up to 30 nonhydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

A preferred class of such Group 4 metal coordination complexes used according to the present invention corresponds to the formula:

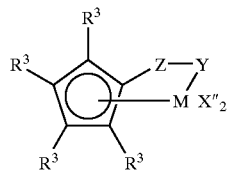

wherein:
M is titanium or zirconium in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, each X" is a hydrocarbyl or silyl group, said group having up to 20 nonhydrogen atoms, or two X" groups together form a $C_{5-30}$ conjugated diene;

Y is —O—, —S—, —NR*—, —PR*—; and

Z is $SiR*_2$, $CR*_2$, $SiR*_2SiR*_2$, $CR*_2CR*_2$, $CR*=CR*$, $CR*_2SiR*_2$, or $GeR*_2$, wherein: R* is as previously defined.

Illustrative Group 4 metal complexes that may be employed in the practice of the present invention include:

cyclopentadienyltitaniumtrimethyl,
indenyltitaniumtrimethyl,
tetrahydroindenyltitaniumtrimethyl,
octahydrofluorenyltitaniumtrimethyl,
(tert-butylamido)(tetramethyl-$\eta^5$-cyclopentadienyl) dimethylsilanetitanium dimethyl,
(tert-butylamido)(tetramethyl-$\eta^5$-cyclopentadienyl)-1,2-ethanediyltitanium dimethyl,
(tert-butylamido)(hexamethyl-$\eta^5$-indenyl) dimethylsilanetitanium dimethyl,
(tert-butylamido)(tetramethyl-$\eta^5$-cyclopentadienyl) dimethylsilane titanium (III) 2-(dimethylamino)benzyl;
(tert-butylamido)(tetramethyl-$\eta^5$-cyclopentadienyl) dimethylsilanetitanium (III) allyl,
(tert-butylamido)(tetramethyl-$\eta^5$-cyclopentadienyl) dimethylsilanetitanium (II) 1,4-diphenyl-1,3-butadiene,
(tert-butylamido)(2-methylindenyl) dimethylsilanetitanium (II) 1,4-diphenyl-1,3-butadiene,
(tert-butylamido)(2-methylindenyl) dimethylsilanetitanium (IV) 1,3-butadiene,
(tert-butylamido)(2,3-dimethylindenyl) dimethylsilanetitanium (II) 1,4-diphenyl-1,3-butadiene,
(tert-butylamido)(2,3-dimethylindenyl) dimethylsilanetitanium (IV) 1,3-butadiene,
(tert-butylamido)(2,3-dimethylindenyl) dimethylsilanetitanium (II) 1,3-pentadiene,
(tert-butylamido) (2-methylindenyl) dimethylsilanetitanium (II) 1,3-pentadiene,
(tert-butylamido)(2-methylindenyl) dimethylsilanetitanium (IV) dimethyl,
(tert-butylamido)(2-methyl-4-phenylindenyl) dimethylsilanetitanium (II) 1,4-diphenyl-1,3-butadiene,
(tert-butylamido)(tetramethyl-$\eta^5$-cyclopentadienyl) dimethylsilanetitanium (IV) 1,3-butadiene,
(tert-butylamido)(tetramethyl-$\eta^5$-cyclopentadienyl) dimethylsilanetitanium (II) 1,4-dibenzyl-1,3-butadiene,
(tert-butylamido)(tetramethyl-$\eta^5$-cyclopentadienyl) dimethylsilanetitanium (II) 2,4-hexadiene,
(tert-butylamido)(tetramethyl-$\eta^5$-cyclopentadienyl) dimethylsilanetitanium (II) 3-methyl-1,3-pentadiene,
(tert-butylamido)(2,4-dimethyl-1,3-pentadien-2-yl) dimethylsilanetitaniumdimethyl,
(tert-butylamido)(1,1-dimethyl-2,3,4,9,10-$\eta$-1,4,5,6,7,8-hexahydronaphthalen-4-yl) dimethylsilanetitaniumdimethyl,
(tert-butylamido)(1,1,2,3-tetramethyl-2,3,4,9,10-$\eta$-1,4,5,6,7,8-hexahydronaphthalen-4-yl) dimethylsilanetitaniumdimethyl,
(tert-butylamido)(tetramethylcyclopentadienyl) dimethylsilanetitanium 1,3-pentadiene,
(tert-butylamido)(3-(N-pyrrolidinyl)inden-1-yl) dimethylsilanetitanium 1,3-pentadiene,
(tert-butylamido)(2-methyl-s-indacen-1-yl) dimethylsilanetitanium 1,3-pentadiene, and
(tert-butylamido)(3,4-cyclopenta(/)(phenanthren-2-yl) dimethylsilanetitanium 1,4-diphenyl-1,3-butadiene.

Bis(L) containing complexes including bridged complexes suitable for use in the present invention include:

biscyclopentadienylzirconiumdimethyl,
biscyclopentadienyltitaniumdiethyl,
biscyclopentadienyltitaniumdiisopropyl,
biscyclopentadienyltitaniumdiphenyl,
biscyclopentadienylzirconium dibenzyl,
biscyclopentadienyltitanium-2,4-pentadienyl,
bispentamethylcyclopentadienyltitaniumdimethyl,
bisindenyltitaniumdimethyl,
indenylfluorenyltitaniumdiethyl,
bisindenyltitaniummethyl(2-(dimethylamino)benzyl),
bisindenyltitanium methyltrimethylsilyl,
bistetrahydroindenyltitanium methyltrimethylsilyl,
bispentamethylcyclopentadienyltitaniumdiisopropyl,
bispentamethylcyclopentadienyltitaniumdibenzyl,
(dimethylsilyl-bis-cyclopentadienyl)zirconiumdimethyl,
(dimethylsilyl-bis-pentamethylcyclopentadienyl) titanium-2,4-pentadienyl,
(methylene-bis-pentamethylcyclopentadienyl)titanium (III) 2-(dimethylamino)benzyl,
(dimethylsilyl-bis-2-methylindenyl)zirconiumdimethyl,
(dimethylsilyl-bis-2-methyl-4-phenylindenyl) zirconiumdimethyl,
(dimethylsilyl-bis-2-methylindenyl)zirconium-1,4-diphenyl-1,3-butadiene,
(dimethylsilyl-bis-2-methyl-4-phenylindenyl)zirconium (II) 1,4-diphenyl-1,3-butadiene,
(dimethylsilyl-bis-tetrahydroindenyl)zirconium(II) 1,4-diphenyl-1,3-butadiene,
(dimethylsilyl-bis-tetrahydrofluorenyl)zirconiumdi (trimethylsily,),
(isopropylidene)(cyclopentadienyl)(fluorenyl) zirconiumdibenzyl, and
(dimethylsilylpentamethylcyclopentadienylfluorenyl) zirconiumdimethyl.

The reagents employed in the preparation and use of the present compounds and catalyst compositions, should be thoroughly dried and deaerated prior to use, and handled under high vacuum or inert reaction conditions. Solid components such as metal oxide supports are preferably dried by heating at 200–500° C., optionally under reduced pressure, for a time from 10 minutes to 100 hours prior to use.

The support when the activator component is used as a supported catalyst component, may be any inert, particulate material, but most suitably is a metal oxide or mixture of metal oxides, preferably alumina, silica, an aluminosilicate or clay material. Suitable volume average particle sizes of the support are from 1 to 1000 µM, preferably from 10 to 100 µM. Most desired supports are calcined silica, which may be treated prior to use to reduce surface hydroxyl groups thereon, by reaction with a silane, a trialkylaluminum, or similar reactive compound. Any suitable means for incorporating the present composition onto the surface of a support (including the interstices thereof) may be used, including dispersing the co-catalyst in a liquid and contacting the same with the support by slurrying, impregnating, spraying, or coating and thereafter removing the liquid, or by combining the cocatalyst and a support material in dry or paste form and intimately contacting the mixture, thereafter forming a dried, particulated product. Such supported catalysts are particularly useful in slurry or gas phase polymerization processes, according to known process conditions.

Suitable polymerizable monomers include ethylenically unsaturated monomers, acetylenic compounds, conjugated or non-conjugated dienes, and polyenes. Preferred monomers include olefins, for examples alpha-olefins having from 2 to 20,000, preferably from 2 to 20, more preferably from 2 to 8 carbon atoms and combinations of two or more of such alpha-olefins. Particularly suitable alpha-olefins include, for example, ethylene, propylene, 1-butene, 1-pentene, 4-methylpentene-1,1-hexene, 1-heptene, 1-octene, 1-nonene, 1-decene, 1-undecene, 1-dodecene, 1-tridecene, 1-tetradecene, 1-pentadecene, or combinations thereof, as well as long chain vinyl terminated oligomeric or polymeric reaction products formed during the polymerization, and $C_{10-30}$ α-olefins specifically added to the reaction mixture in order to produce relatively long chain branches in the resulting polymers. Preferably, the alpha-olefins are ethylene, propene, 1-butene, 4-methyl-pentene-1,1-hexene, 1-octene, and combinations of ethylene and/or propene with one or more of such other alpha-olefins. Other preferred monomers include styrene, halo- or alkyl substituted styrenes, tetrafluoroethylene, vinylcyclobutene, 1,4-hexadiene, dicyclopentadiene, ethylidene norbornene, and 1,7-octadiene. Mixtures of the above-mentioned monomers may also be employed.

In general, the polymerization may be accomplished at conditions well known in the prior art for Ziegler-Natta or Kaminsky-Sinn type polymerization reactions. Examples of such well known polymerization processes are depicted in WO 88/02009, U.S. Pat. Nos. 5,084,534, 5,405,922, 4,588,790, 5,032,652, 4,543,399, 4,564,647, 4,522,987, and elsewhere. Preferred polymerization temperatures are from 0–250° C. Preferred polymerization pressures are from atmospheric to 3000 atmospheres.

Molecular weight control agents can be used in combination with the present cocatalysts. Examples of such molecular weight control agents include hydrogen, silanes or other known chain transfer agents. Preferred polymers have Mw/Mn of less than 2.5, more preferably less than 2.3. Such narrow molecular weight distribution polymer products are highly desirable due to improved tensile strength properties.

Gas phase processes for the polymerization of $C_{2-6}$ olefins, especially the homopolymerization and copolymerization of ethylene and propylene, and the copolymerization of ethylene with $C_{3-6}$ α-olefins such as, for example, 1-butene, 1-hexene, 4-methyl-1-pentene are well known in the art. Such processes are used commercially on a large scale for the manufacture of high density polyethylene (HDPE), medium density polyethylene (MDPE), linear low density polyethylene (LLDPE) and polypropylene.

The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported above a perforated plate, the fluidization grid, by a flow of fluidization gas.

The gas employed to fluidize the bed comprises the monomer or monomers to be polymerized, and also serves as a heat exchange medium to remove the heat of reaction from the bed. The hot gases emerge from the top of the reactor, normally via a tranquilization zone, also known as a velocity reduction zone, having a wider diameter than the fluidized bed and wherein fine particles entrained in the gas stream have an opportunity to gravitate back into the bed. It can also be advantageous to use a cyclone to remove ultra-fine particles from the hot gas stream. The gas is then normally recycled to the bed by means of a blower or compressor and a one or more heat exchangers to strip the gas of the heat of polymerization.

A preferred method of cooling of the bed, in addition to the cooling provided by the cooled recycle gas, is to feed a volatile liquid to the bed to provide an evaporative cooling effect. The volatile liquid employed in this case can be, for example, a volatile inert liquid, for example, a saturated hydrocarbon having 3 to 8, preferably 4 to 6, carbon atoms. In the case that the monomer or comonomer itself is a volatile liquid, or can be condensed to provide such a liquid this can be suitably be fed to the bed to provide an evaporative cooling effect. Examples of olefin monomers which can be employed in this manner are olefins containing from 3 to eight, preferably from 3 to six carbon atoms. The volatile liquid evaporates in the hot fluidized bed to form gas which mixes with the fluidizing gas. If the volatile liquid is a monomer or comonomer, it will undergo some polymerization in the bed. The evaporated liquid then emerges from the reactor as part of the hot recycle gas, and enters the compression/heat exchange part of the recycle loop. The recycle gas is cooled in the heat exchanger and, if the temperature to which the gas is cooled is below the dew point, liquid will precipitate from the gas. This liquid is desirably recycled continuously to the fluidized bed. It is possible to recycle the precipitated liquid to the bed as liquid droplets carried in the recycle gas stream, as described, for example, in EP-A-89691, U.S. Pat. No. 4,543,399, WO 94/25495 and U.S. Pat. No. 5,352,749. A particularly preferred method of recycling the liquid to the bed is to separate the liquid from the recycle gas stream and to reinject this liquid directly into the bed, preferably using a method which generates fine droplets of the liquid within the bed. This type of process is described in WO 94/28032, the teachings of which are also hereby incorporated by reference.

The polymerization reaction occurring in the gas fluidized bed is catalyzed by the continuous or semi-continuous addition of catalyst. The catalyst can also be subjected to a prepolymerization step, for example, by polymerizing a small quantity of olefin monomer in a liquid inert diluent, to provide a catalyst composite comprising catalyst particles embedded in olefin polymer particles.

The polymer is produced directly in the fluidized bed by catalyzed (co)polymerization of the monomer(s) on the fluidized particles of catalyst, supported catalyst or prepolymer within the bed. Start-up of the polymerization reaction is achieved using a bed of preformed polymer particles, which, preferably, is similar to the target polyolefin, and conditioning the bed by drying with inert gas or nitrogen prior to introducing the catalyst, the monomer(s) and any other gases which it is desired to have in the recycle gas stream, such as a diluent gas, hydrogen chain transfer agent, or an inert condensable gas when operating in gas phase condensing mode. The produced polymer is discharged continuously or discontinuously from the fluidized bed as desired, optionally exposed to a catalyst kill and optionally pelletized.

Similarly, supported catalysts for use in slurry polymerization may be prepared and used according to previously known techniques. Generally such catalysts are prepared by the same techniques as are employed for making supported catalysts used in gas phase polymerizations. Slurry polymerization conditions generally encompass polymerization of a $C_{2-20}$ olefin, diolefin, cycloolefin, or mixture thereof in an aliphatic solvent at a temperature below that at which the polymer is readily soluble in the presence of a supported catalyst.

It is understood that the present invention is operable in the absence of any component which has not been specifically disclosed. The following examples are provided in order to further illustrate the invention and are not to be construed as limiting. Unless stated to the contrary, all parts and percentages are expressed on a weight basis. Where stated the term "room temperature" refers to a temperature from 20 to 25° C., the term "overnight" refers to a time from 12 to 18 hours, and the term "mixed alkanes" refers to the aliphatic solvent, Isopar® E, available from Exxon Chemicals Inc.

EXAMPLES

Tris(perfluorophenyl)borane (FAB) was obtained as a solid from Boulder Scientific Inc. and used without further purification. Trimethylaluminum (TMA) in toluene or hexanes, and triisobutylaluminum (TIBA) were purchased from Aldrich Chemical Co. Tris(perfluorophenyl)aluminum (FML, as a toluene adduct) was prepared by exchange reaction between tris(perfluorophenyl)borane and trimethylaluminum as disclosed in U.S. Pat. No. 5,602,269. All solvents were purified using the technique disclosed by Pangborn et al, *Organometallics*, 1996, 15, 1518–1520. All compounds and solutions were handled under an inert atmosphere (dry box). All chemical shift for $^{19}F$ NMR spectra were relative to a fixed external standard ($CFCl_3$) in benzene $d_6$ or toluene $d_8$, both of which were dried over N/K alloy and filtered prior to use. $^1H$ and $^{13}C$ NMR shifts were referenced to internal solvent resonances and are reported relative to TMS.

Example 1

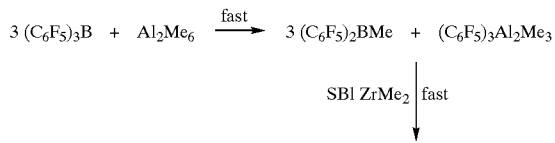

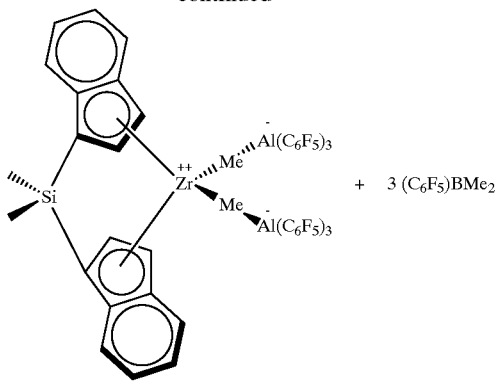

In a glove box, FAB (0.030 g, 0.06 mmol) was dissolved in 0.7 mL toluene-$d_8$ in a small vial and TMA (0.02 mL, 2.0 M in toluene, 0.04 mmol) was added. $^1H$ and $^{19}F$ NMR of the resulting mixture indicated formation of two major products $(C_6F_5)_2BMe$ and $(C_6F_5)_3Al_2Me_3$, after mixing for 10 min. Rac-dimethylsilanebis(indenyl-1-yl)zirconium dimethyl (SBIZrMe$_2$, 0.004 g, 0.01 mmol) was added to the above exchange mixture and a deep red solution resulted immediately after the mixing. $^1H$ and $^{19}F$ NMR data are consistent with the formation of rac-dimethylsilanebis(indenyl-1-yl)zirconium bis[($\mu$-methyl)tris(pentafluorophenyl)aluminum, and $(C_6F_5)BMe_2$ as a by-product. The resulting solution was transferred to a catalyst addition tank and injected as needed into a polymerization reactor.

Example 2

In a glove box, FAB (0.02 g, 0.04 mmol) was dissolved in 0.7 mL toluene-$d_8$ in a small vial and TMA (0.02 mL, 2.0 M in toluene, 0.04 mmol) was added. $^1H$ and $^{19}F$ NMR of the resulting mixture indicated formation of two major products $(C_6F_5)_2BMe$ and $(C_6F_5)_2Al_2Me_4$, after mixing for 10 min. Dimethylsilyl(tetramethyl-cyclopentadienyl((t-butylamido)titanium dimethyl (0.01 mmol) was added to the above exchange mixture and an orange solution resulted immediately after the mixing. $^1H$ and $^{19}F$ NMR data are consistent with the structure dimethylsilyl(tetramethyl-cyclopentadienyl((t-butylamido)titanium bis[($\mu$-methyl)tris(pentafluorophenyl) aluminum, and $(C_6F_5)BMe_2$ as a by-product. The resulting solution was transferred to a catalyst addition tank and injected as needed into a polymerization reactor.

Example 3 (Supported Catalyst Preparation)

To 3 g samples of silica which had been thoroughly dried and surface hydroxyl content removed by prereaction with triethylaluminum and slurried in 25 mL toluene are added 5.0 mL toluene solutions of the metal complexes prepared substantially according to the techniques of Examples 1 and 2. The mixtures are agitated for 1 hour, washed twice with 10 mL pentane, and dried in vacuo to yield the supported catalyst product.

Polymerization

A 2-liter Parr reactor was used in the polymerizations. All feeds were passed through columns of alumina and a decontaminant (Q-5™ catalyst available from Englehardt Chemicals Inc.) prior to introduction into the reactor. Catalyst and cocatalysts are handled in a glovebox containing an atmosphere of argon or nitrogen.

A stirred 2.0 liter reactor is charged with about 740 g of mixed alkanes solvent and 118 g of 1-octene comonomer. Hydrogen is added as a molecular weight control agent by differential pressure expansion from a 75 ml addition tank at 25 psi (2070 kPa). The reactor is heated to the polymerization temperature of 130° C. and saturated with ethylene at 500 psig (3.4 MPa). The polymerization conditions are maintained for 15 minutes with ethylene added on demand. The resulting solution is removed from the reactor, quenched with isopropyl alcohol, and stabilized by addition of 10 ml of a toluene solution containing approximately 67 mg of a hindered phenol antioxidant (Irganox™ 1010 from Ciba Geigy Corporation) and 133 mg of a phosphorus stabilizer (Irgafos 168 from Ciba Geigy Corporation).

Between polymerization runs a wash cycle in which 850 g of mixed alkanes is added to the reactor and the reactor heated to 150° C. The reactor is emptied of the heated solvent immediately before beginning a new polymerization run.

Polymers are recovered by drying in a vacuum oven set at 140° C. for about 20 hours. Density values are derived by determining the polymer's mass when in air and when immersed in methylethyl ketone. Micro melt index values (MMI) are obtained using a Custom Scientific Instrument Inc. Model CS-127MF-015 apparatus at 190° C. MMI (micro-melt index) are unit-less values calculated as follows: MMI=1/(0.00343 t −0.00251), where t=time in seconds. Results are contained in Table 1.

TABLE 1

| Catalyst | Catalyst µmole | Exotherm (° C.) | Yield (g) | Eff. (g /µg metal) | Density g/ml | MMI* |
|---|---|---|---|---|---|---|
| Example 1 | 0.4 | 4.4 | 46.7 | 1.28 | 0.925 | 26.3 |
| Example 2 | 1 | 0.7 | 32.8 | 0.7 | 0.902 | 1.9 |

*micro melt index 190° C., (comparative technique of melt index determination)

What is claimed is:

1. A process for forming a composition useful as a catalyst for the polymerization of addition polymerizable monomers, the steps of the process comprising:

a) contacting under exchange reaction conditions a tri(hydrocarbyl)aluminum compound with a tri(fluoroaryl)boron compound; and b) contacting the reaction product from step a) without recovery or isolation thereof, with a neutral Group 3–10 metal complex.

2. A process according to claim 1 wherein the tri(hydrocarbyl)aluminum compound corresponds to the formula: $AlQ^1_3$, wherein, $Q^1$ independently each occurrence is alkyl, cycloalkyl, or aryl of up to 20 carbons, and the tri(fluoroaryl)boron compound corresponds to the formula: $BAr^f_3$, wherein, $Ar^f$ independently each occurrence is a fluoroaryl group of up to 20 carbons.

3. A process according to claim 2 wherein $Ar^f$ each occurrence is perfluorophenyl and $Q^1$ each occurrence is methyl.

* * * * *